(12) United States Patent
Hentzel et al.

(10) Patent No.: US 6,877,007 B1
(45) Date of Patent: Apr. 5, 2005

(54) METHOD AND APPARATUS FOR TRACKING A USER'S INTERACTION WITH A RESOURCE SUPPLIED BY A SERVER COMPUTER

(76) Inventors: Anna M. Hentzel, 2218 McKinley Ct., Ames, IA (US) 50010; Timothy I. Hentzel, 440 Utah St., San Francisco, CA (US) 94110; Robert R. Hentzel, 440 Utah St., San Francisco, CA (US) 94110; Brian F. Allen, 19 Rausch, Apt. C., San Francisco, CA (US) 94103

(*) Notice: Subject to any disclaimer, the term of this patent is extended or adjusted under 35 U.S.C. 154(b) by 302 days.

(21) Appl. No.: 09/978,845

(22) Filed: Oct. 16, 2001

(51) Int. Cl.[7] .............................................. G06F 17/30
(52) U.S. Cl. ...................................... 707/10; 709/224
(58) Field of Search ............................ 707/10; 709/224

(56) References Cited

U.S. PATENT DOCUMENTS

| | | | | |
|---|---|---|---|---|
| 5,675,510 A | * | 10/1997 | Coffey et al. | 709/224 |
| 5,796,952 A | * | 8/1998 | Davis et al. | 709/224 |
| 6,108,637 A | * | 8/2000 | Blumenau | 705/7 |
| 2003/0037138 A1 | * | 2/2003 | Brown et al. | 709/225 |

OTHER PUBLICATIONS

IBM TDB, Algorithim to Inhibit Record/Play in a Non-Distplay Field, Apr. 1990, vol. 32, No. 11, PP. 462–465.*

* cited by examiner

Primary Examiner—Jack M Choules
(74) Attorney, Agent, or Firm—Christensen O'Connor Johnson Kindness PLLC

(57) ABSTRACT

A method and system is provided for tracking a user's interaction with a resource or resources supplied by a server computer. When a user requests a Web page from a server for viewing using a Web browser, the user is redirected to a tracking server. The tracking server sends the requested Web page, with an embedded script to the user's computer along with an application program that can record the user's interaction with the Web page. As the user interacts with the Web page, input made by the user, such as mouse movements, button clicks, typing, etc. is streamed back to the tracking server by the application program. The recorded session may be later retrieved from the tracking server for playback. Based on the user's input, the tracked resource may be modified, such as making it more user friendly or more easily navigable.

5 Claims, 13 Drawing Sheets

METHOD AND APPARATUS FOR TRACKING A USER'S INTERACTION WITH A RESOURCE SUPPLIED BY A SERVER COMPUTER

FIELD OF THE INVENTION

In general, the present invention relates to computer software, and, in particular, to a method for tracking a user's interaction with a server computer.

BACKGROUND OF THE INVENTION

It is a truth universally acknowledged that, in order to succeed, a business must study the habits, desires, and behavior of its customers. For companies conducting business over the Internet and the World Wide Web ("Web" or "WWW"), this necessarily extends to examining and measuring their customers' interaction with their Web sites.

Commercial software currently exists to perform this analysis at the page navigation level. Such software allows companies to track and analyze such information as total traffic to a particular Web page, advertising revenue, and referral visits. However, current software tracking tools do not provide user interface ("UI") designers and marketing personnel the ability to study the users' interaction within a single Web page. Specifically, current software does not permit the analysis of how a single user interacts with a particular Web page. For example, a company may wish to know how a user interacts with the location of specific content of the Web page so that it can optimize it's placement. Presently, for companies to receive this kind of feedback from a potential user, companies must conduct experiments with test subjects in controlled environments. Typically, a human observer is utilized to physically observe and record a user's interaction with a Web page. Experimental testing such as this is expensive and may lead to less than accurate results, which are unacceptable in today's business environment.

Therefore, in light of these deficiencies, there is a need for a method and apparatus for tracking a user'interaction with a single resource, such as a Web page, or multiple resources, such as Web sites. There is a further need for a method and system for tracking a user's interaction with a single or multiple resources that can provide an extremely accurate and inexpensive analysis of said interaction.

SUMMARY OF THE INVENTION

A method and apparatus for tracking a user's interaction with a resource supplied by a server computer is provided to overcome the deficiencies in the prior art. The present invention comprises a Web-based tool that allows every aspect of a user's interaction with a targeted Web page (or Web site with multiple Web pages) to be transparently recorded and played back. The transparency is important because it removes any analogues of the "Hawthorne Effect," that may be introduced during artificial usability studies overseen by humans. By developing a tool that can record and play back a user's interaction with specific Web pages, the business or resource designer of the Web pages can view and analyze the user's interaction for ways to improve the Web pages, such as making it more user friendly, more easily navigable, and more effective advertising.

In accordance with an aspect of the present invention, a method is provided for tracking a user's interaction with a resource is provided. A server computer obtains a request for a resource. The server computer transmits the resource and a program module for capturing data describing the user's interaction with the resource to a client computer. A stream of data describing the user's interaction with the resource, such as mouse movement, mouse clicks, etc., is transmitted from the program module to the server computer and saved.

In accordance with another aspect of the present invention, a method is provided for tracking a user's interaction with a resource. In response to a request for a tracked resource stored at a server computer, the tracked resource and a program module for capturing data describing the user's interaction with the resource is received. The user's interaction with the resource is captured by the program module and is transmitted as a data stream.

In accordance with yet another aspect of the present invention, a method is provided for replaying a user's interactive session with a tracked resource. In particular, an application program is provided that may request data describing an interactive session from a server computer. Data representative of the specific recorded session is received by the application program along with a copy of the tracked resource. The application program utilizes the data describing the interactive session and the copy of the tracked resource to recreate and display the interactive session.

A computer-readable medium and a computer-controlled apparatus are also provided for tracking a user's interaction with a server computer.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
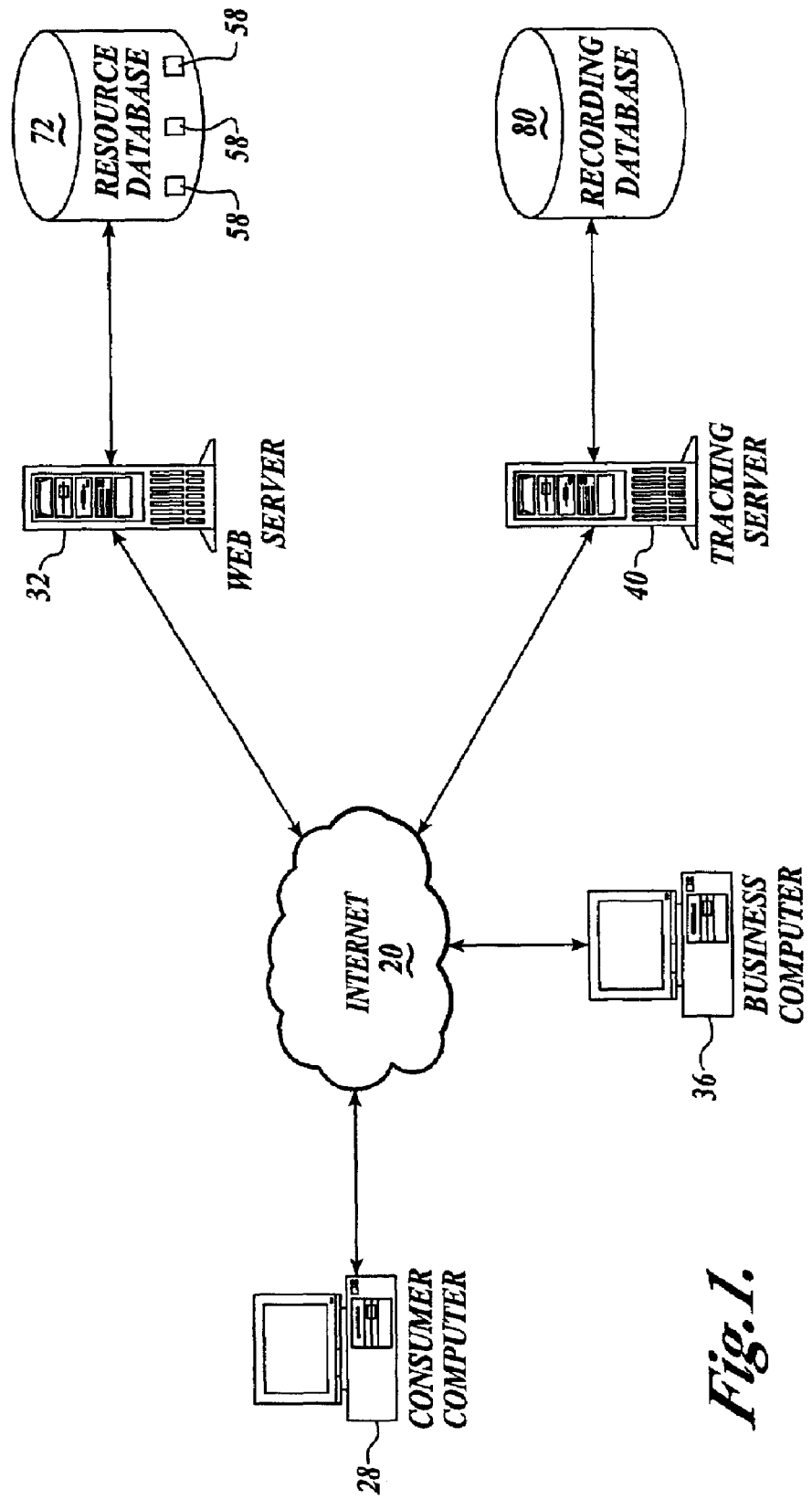
FIG. 1 is a block diagram showing an illustrative operating environment for implementing aspects of the present invention.

In accordance with the present invention, an illustrative embodiment of a system for tracking a user's interaction with a resource, such as a Web page, is generally shown in FIG. 1. In operation, a computer user requests a resource 58, such as a Web page or other displayable data file, from a server computer, such as a Web server 32, for viewing using a Web browser executing on the consumer computer 28. The Web server 32 determines whether to redirect the user to a different server computer 40 (hereinafter referred to as "tracking server") that can record the user's interaction with the specific Web page of the Web server 32. The interaction by the user that may be recorded may include, but is not limited to, mouse movements, keyboard strokes, menu scrolling, etc. If the Web server 32 redirects the user to the tracking server 40, the tracking server 40 receives the redirected user request and transmitted origination data from the Web server 32.

Next, the tracking server requests and receives the most recent version of the Web page from the Web server 32 and merges the page retrieved from the Web server 32 with a client-side executable component that can initiate the execution of a program module for transmitting data describing the user's interaction with the Web page to the tracking server 40. In turn, the tracking server 40 sends the modified or merged resource, in this case the Web page, with the embedded script to the consumer computer 28 along with the program module (hereinafter referred to as "tracking application") that can record the user's interaction with the resource 58. As the user interacts with the resource, i.e. Web page, all of the inputs such as mouse movements, button clicks, typing, etc. generated by the user through various input devices are recorded by the tracking application and streamed back to the tracking server 40. At a later date, a business running the Web server 32 can access the recorded session from the tracking server 40 for analysis. Based on the recorded input, the business or resource designer can view and analyze the user's input to identify ways to improve the resource, such as making it more user friendly or more easily navigable.

Figure 2:
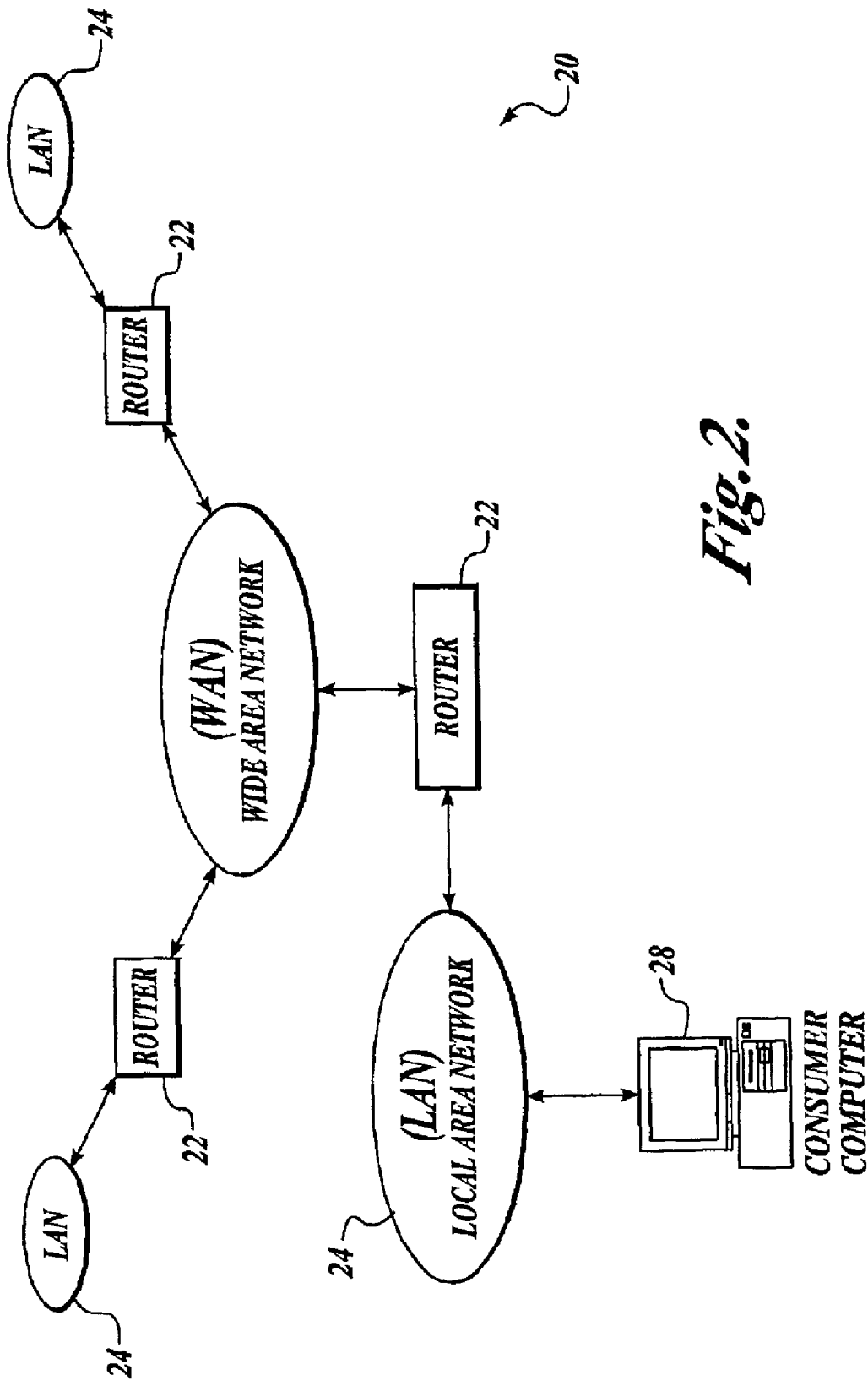
FIG. 2 is a block diagram showing a representative portion of the Internet.

Referring now to FIG. 2, an illustrative operating environment for an embodiment of the present invention will be described. Aspects of the present invention are implemented as an executable software component located on a server computer, such as the tracking server 40, accessible via the Internet. As is well known to those skilled in the art, the term "Internet" refers to the collection of networks and routers that use the Transmission Control Protocol/Internet Protocol ("TCP/IP") to communicate with one another. A representative section of the Internet 20 is shown in FIG. 1, in which a plurality of local area networks ("LANs") 24 and a wide area network ("WAN") 26 are interconnected by routers 22. The routers 22 are special purpose computers used to interface one LAN or WAN to another. Communication links within the LANs may be twisted wire pair, or coaxial cable, while communication links between networks may utilize 56 Kbps analog telephone lines, 1 Mbps digital T-1 lines, 45 Mbps T-3 lines or other communications links known to those skilled in the art. Furthermore, a consumer computer 28 and other related electronic devices can be remotely connected to either the LANs 24 or the WAN 26 via a modem and temporary telephone or wireless link. It will be appreciated that the Internet 20 comprises a vast number of such interconnected networks, computers, and routers and that only a small, representative section of the Internet 20 is shown in FIG. 2.

The Internet has recently seen explosive growth by virtue of its ability to link computers located throughout the world. As the Internet has grown, so has the WWW. As is appreciated by those skilled in the art, the WWW is a vast collection of interconnected or "hypertext" documents written in HyperText Markup Language ("HTML"), or other markup languages, that are electronically stored at "WWW sites" or "Web sites" throughout the Internet. Other interactive hypertext environments may include proprietary environments such as those provided by America Online or other online service providers, as well as the "wireless web" provided by various wireless networking providers. One skilled in the relevant art will appreciate that the present invention can be implemented in any such interactive hypertext environments.

A WWW site is a server/computer connected to the Internet that has mass storage facilities for storing hypertext documents and other types of resources and that runs administrative software for handling requests for those stored hypertext documents. A hypertext document normally includes a number of hyperlinks, i.e., highlighted portions of text which link the document to another hypertext document possibly stored at a WWW site elsewhere on the Internet. Each hyperlink is associated with a Uniform Resource Locator ("URL") that provides the exact location of the linked document on a server connected to the Internet and describes the document. Thus, whenever a hypertext document is retrieved from any WWW server, the document is considered to be retrieved from the WWW. As is known to those skilled in the art, a WWW server may also include facilities for storing and transmitting application programs, such as application programs written in the JAVA® programming language from Sun Microsystems, for execution on a remote computer. Likewise, a WWW server may also include facilities for executing scripts and other application programs on the WWW server itself.

A consumer or other remote user may retrieve hypertext documents from the WWW via a WWW browser application program. A WWW browser, such as Netscape's NAVIGATOR® or Microsoft's Internet Explorer, is a software application program for providing a graphical user interface to the WWW. Upon request from the user via the WWW browser, the WWW browser accesses and retrieves the desired hypertext document from the appropriate WWW server using the URL for the document and a protocol known as HyperText Transfer Protocol ("HTTP"). HTTP is a higher-level protocol than TCP/IP and is designed specifically for the requirements of the WWW. It is used on top of TCP/IP to transfer hypertext documents between servers and clients. The WWW browser may also retrieve application programs from the WWW server, such as JAVA applets, for execution on the consumer computer 28.

Referring back to FIG. 1, an actual embodiment of the present invention will now be described. A user or consumer computer 90 connects to the Internet 20 through a modem or other type of connection. Once connected to the Internet 20, a user of the consumer computer 28 may utilize a WWW browser to view and interact with Web pages on WWW sites such as a WWW site provided by the Web server 32. As is known to those skilled in the art, the consumer computer 28 may comprise a general purpose personal computer capable of executing a WWW browser. The consumer computer 28 may also comprise another type of computing device such as a palm-top computer, a cell phone, personal digital assistant, and the like. Consumer computer 28 is described in greater detail below with respect to FIG. 3.

Figure 3:
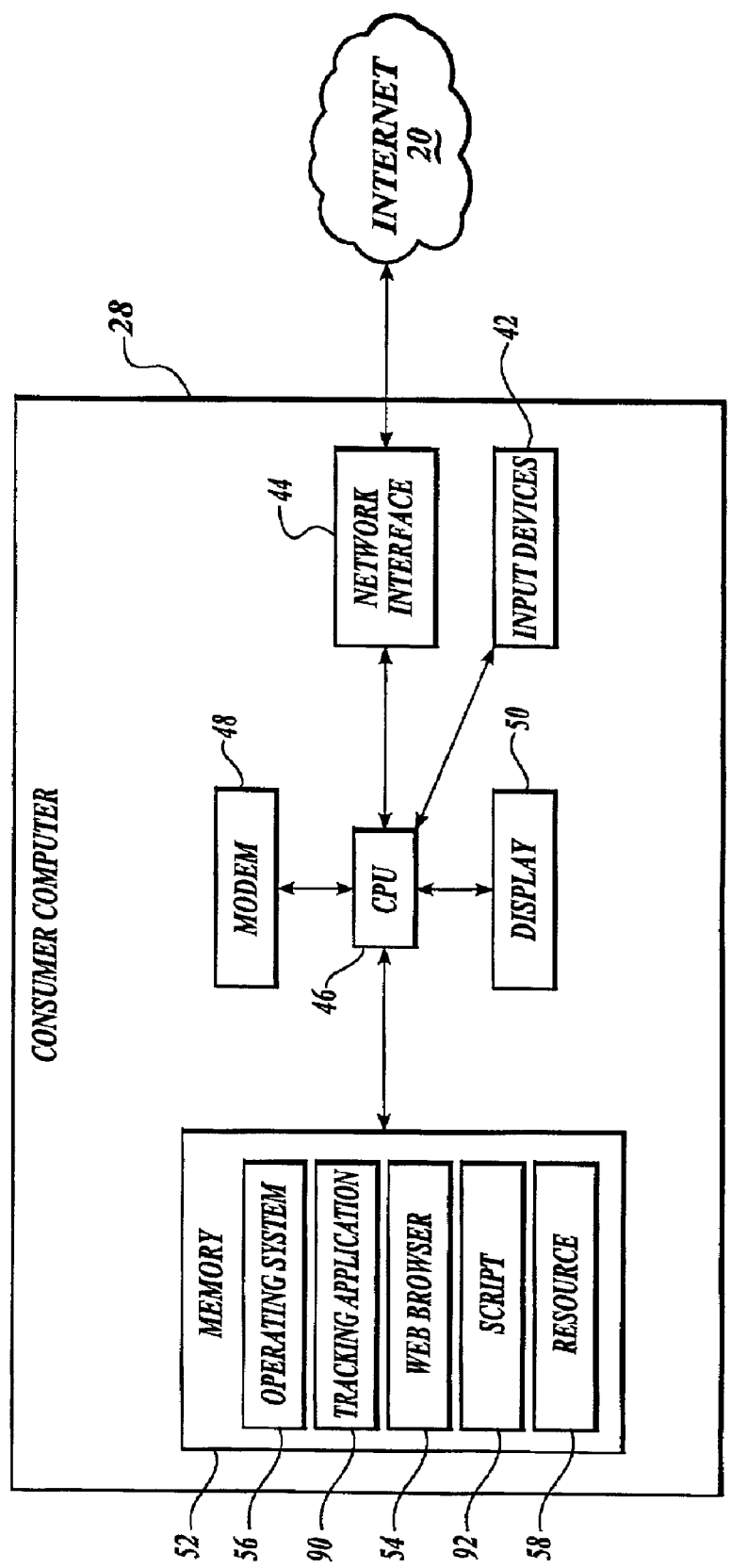
FIG. 3 is a block diagram depicting an illustrative architecture for a consumer computer utilized to view and interact with a resource supplied by a server computer in accordance with an actual embodiment of the present invention.

Turning now to FIG. 3, an illustrative architecture for the consumer computer 28 utilized to view and interact with a resource 58 supplied by the Web server 32 will be described. Those of ordinary skill in the art will appreciate that the consumer computer 28 includes many more components then those shown in FIG. 3. However, it is not necessary that all of these generally conventional components be shown in order to disclose an illustrative embodiment for practicing the present invention.

As shown in FIG. 3, the consumer computer 28 includes a network interface 44 for connecting directly to a LAN or a WAN, or for connecting remotely to a LAN or WAN. Those of ordinary skill in the art will appreciate that the network interface 44 includes the necessary circuitry for such a connection, and is also constructed for use with the TCP/IP protocol, the particular network configuration of the LAN or WAN it is connecting to, and a particular type of coupling medium. The consumer computer 28 may also be equipped with a modem 48 for connecting to the Internet through a point to point protocol ("PPP") connection or a SLIP connection as known to those skilled in the art.

The consumer computer 28 also includes a processing unit 46, a display 50, and a memory 52. The memory 52 generally comprises a random access memory ("RAM"), a read-only memory ("ROM") and a permanent mass storage device, such as a disk drive. The memory 52 stores an operating system 56 for controlling the operation of the consumer computer 28. In one actual embodiment of the invention, the operating system 56 provides a graphical operating environment, such as Microsoft Corporation's WINDOWS® graphical operating system in which activated application programs are represented as one or more graphical application windows with a display visible to the user.

The memory 52 also includes a WWW browser 54, such as Netscape's NAVIGATOR® or Microsoft's Internet Explorer browser, for accessing the WWW. It will be appreciated that these components may be stored on a computer-readable medium and loaded into the memory 52 of the consumer computer 28 using a drive mechanism associated with the computer-readable medium, such as a floppy, CD-ROM or DVD-ROM drive. The memory 52 may also include a tracking application 90, resources 58, and a script 92 received from the tracking server 40 via the Internet 20. As will be described in greater detail below, the user's interaction with the resources (through the use of the WWW browser 54) may be recorded by the tracking application 90.

The memory 52, network interface 44, display 50, and modem 48 are all connected to the processing unit 46 via one or more buses. Consumer computer 28 may also include several input devices 42 such as pointing devices, keyboards, or light pens which are connected to the processing unit 46 via one or more buses. As would be generally understood, other peripherals may also be connected to the processing unit in a similar manner.

As mentioned briefly above, a server computer generally designated as Web server 32 is also connected to the Internet 20. The Web server 32 comprises a general purpose server computer and is described in more detail below with reference to FIG. 4. The Web server 32 stores resources, such as Web pages, and receives requests for resources from the consumer computer 28. For instance, a user operating the consumer computer 28 may wish to receive information regarding flight information from a travel Web site running on the Web server 32. In response to these requests, the Web server 32 determines whether to redirect the request from the consumer computer 28 to the tracking server 40. If the Web server 32 determines that the user's request should be redirected, the Web server 32 redirects the request to the tracking server 40 so that the user's interaction with the requested resource may be recorded. According to an embodiment of the present invention, only a portion of those users requesting resources from the Web server 32 are redirected to the tracking server 40.

Figure 4:
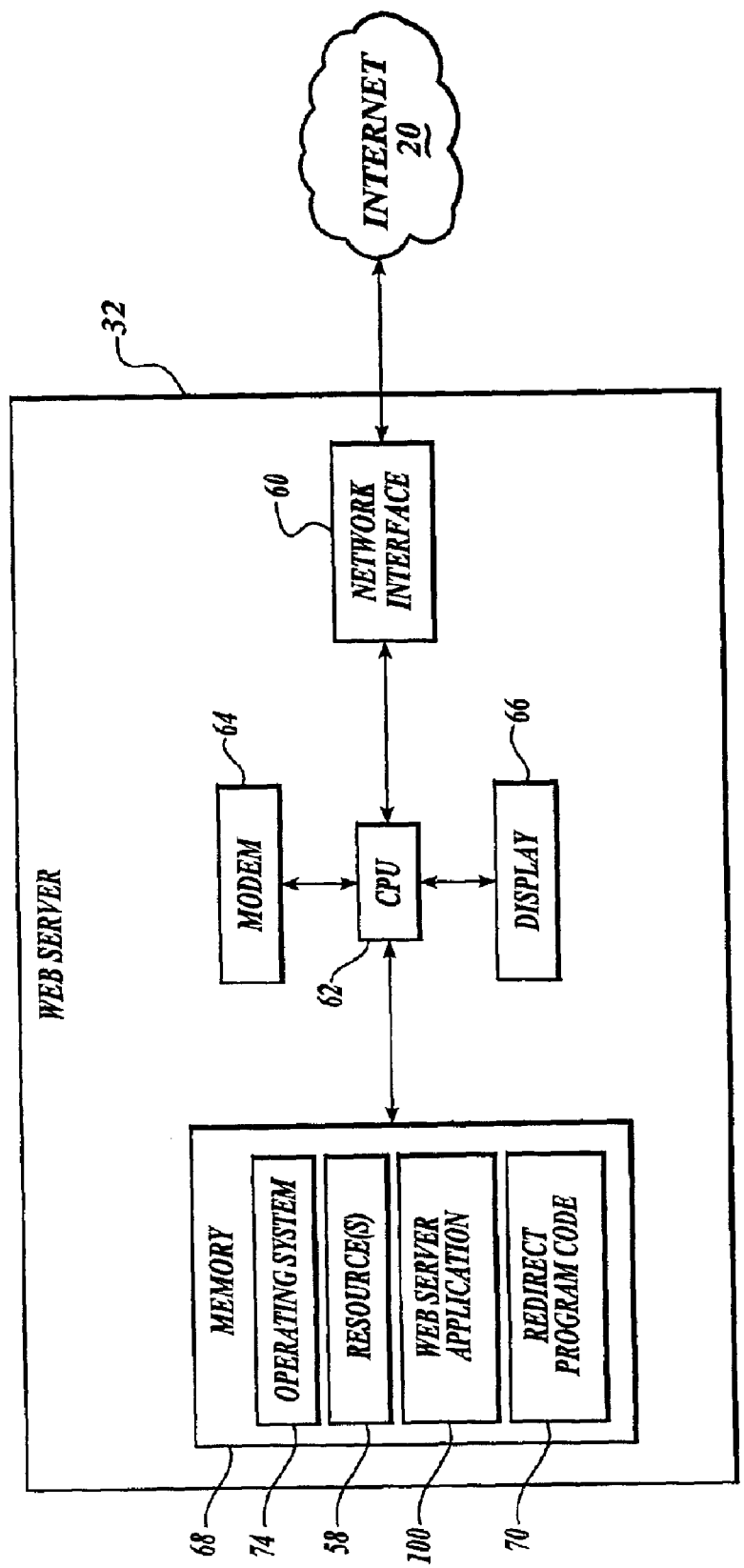
FIG. 4 is a block diagram depicting an illustrative architecture for a server computer utilized to provide a resource to a consumer computer in accordance with aspects of the present invention.

Referring now to FIG. 4, an illustrative architecture for an Web server 32 utilized to provide resources 58 to the consumer computer 28 will be described. As used herein the term "resource" comprises any type of data file or data files that a user may view or otherwise interact with utilizing a Web browser, such as HTML. Those of ordinary skill in the art will appreciate that the Web server 32 includes many more components than those shown in FIG. 4. However, it is not necessary that all of these generally conventional components be shown in order to disclose an illustrative embodiment for practicing the present invention. Moreover, although the computer system described in FIG. 4 is described as a server, it will be appreciated that the function of the document server may be implemented by computer systems not generally classified as server-type computer systems. Further, although only one Web server 32 is depicted in FIG. 1, it will be appreciated that other Web servers 32 may be located elsewhere on the Internet 20 and be utilized to serve resources 58 to a consumer computer 28.

As shown in FIG. 4, the Web server 32 includes a network interface 60 for connecting directly to a LAN or a WAN, or for connecting remotely to a LAN or WAN. Those of ordinary skill in the art will appreciate that the network interface 60 includes the necessary circuitry for such a connection, and is also constructed for use with the TCP/IP protocol, the particular network configuration of the LAN or WAN it is connecting to, and a particular type of coupling medium.

The Web server 32 also includes a processing unit 62, a display 66, and a mass memory 68. The mass memory 68 generally comprises a RAM, a ROM and a permanent mass storage device, such as a hard disk drive, tape drive, optical drive, floppy disk drive, or combination thereof. The memory 68 stores an operating system 74 for controlling the operation of the Web server 32. It will be appreciated that the operating system component 74 may comprise a general-purpose server operating system as is known to those of ordinary skill in the art, such as UNIX, LINUX™, or Microsoft WINDOWS NT®.

The memory 68 may include one or more resources 58 which are to be provided in response to requests from WWW browsers. The Web server application 100 receives and responds to such requests. As will be described below, each resource 58 to be tracked contains a redirect program code 70 generated by the playback request processing application of the tracking server that will redirect a portion of the requests from the consumer computer to the tracking server. Along with redirecting the request, the redirect program code 70 transmits origination data to the tracking server, as will be described in more detail below. Furthermore, the resource 58 may be retrieved from a database 72 (FIG. 1). It will be appreciated that these components may be stored on a computer-readable medium and loaded into memory 68 of the Web server 32 using a drive mechanism associated with the computer-readable medium, such as a floppy, CD-ROM or DVD-ROM drive. The memory 68, network interface 60, display 66, and modem 64 are all connected to the processing unit 62 via one or more buses. As would be generally understood, other peripherals may also be connected to the processing unit in a similar manner.

A business computer 36 is also connected to the Internet 20 and may be utilized to control the operation of the Web server 32. The business computer 36 may also comprise a general purpose computer capable of executing a WWW browser program. The business computer 36 is maintained and operated by a business 38 wanting to conduct business over the Internet 20. The business computer 36 is utilized to create, customize, maintain, and operate an e-commerce WWW site ("Web site") on the Web server 40. For example, the business 38 may want to establish a travel business on the Internet and may use business computer 36 to create the Web site located on the Web server 40. The business computer 36 may include components similar to the consumer computer 28 described in greater detail above with respect to FIG. 3.

A tracking server 40 is also connected to the Internet 20, and may be utilized by the business 38 to record and playback a user's interactive session with the resource(s) 58. As used herein, the term "session" or "interactive session" may comprise all inputs made by a user via input devices such as a mouse, keyboard or the like, when viewing and interacting with a Web site, which can be a single tracked resource or multiple tracked resources 58. These inputs can also be referred to as data or events. While the tracking server 40 is described and illustrated herein as being a remote server, separate from the Web server 32, one skilled in the relevant art will appreciate that the Web server 32 may execute the functions of both the Web server 32 and the tracking server 40 described herein.

Figure 5:
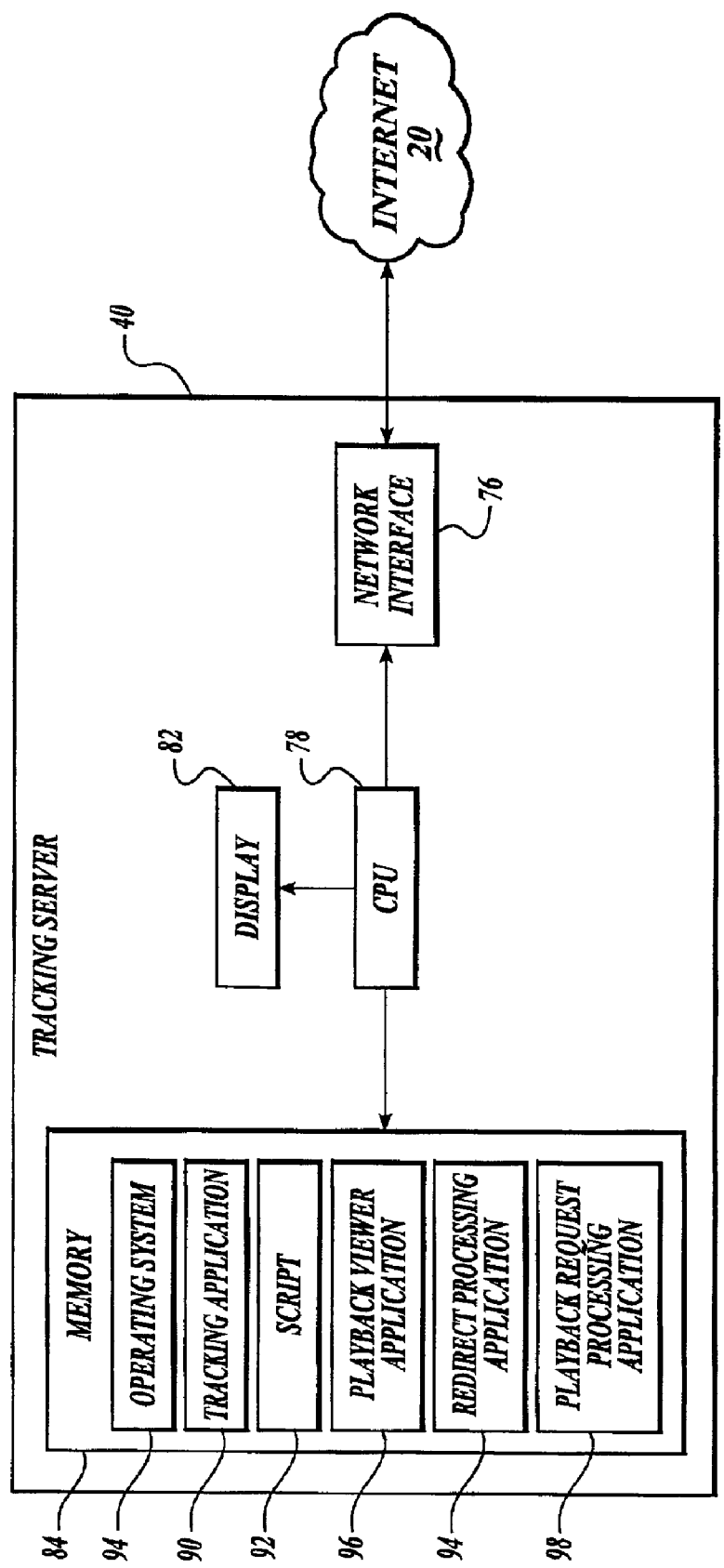
FIG. 5 is a block diagram depicting an illustrative architecture for a tracking server utilized to record a user's interaction via a consumer computer with a resource from a server computer in accordance with an actual embodiment of the present invention.

Referring now to FIG. 5, an illustrative architecture for the tracking server 40 will be described. Those of ordinary skill in the art will appreciate that the tracking server 40 includes many more components then those shown in FIG. 5. However, it is not necessary that all of these generally conventional components be shown in order to disclose an illustrative embodiment for practicing the present invention.

As shown in FIG. 5, the tracking server 40 is connected to the Internet 20 via a network interface 76. Those of ordinary skill in the art will appreciate that the network interface 76 includes the necessary circuitry for connecting the tracking server 40 to the Internet 20, and is constructed for use with the TCP/IP protocol, the particular network configuration of the LAN or WAN it is connecting to, and a particular type of coupling medium.

The tracking server 40 also includes a processing unit 78, a display 82, and a mass memory 84, all connected via a communication bus, or other communication device. The mass memory 84 generally comprises a RAM, ROM, and a permanent mass storage device, such as a hard disk drive, tape drive, optical drive, floppy disk drive, or combination thereof. The mass memory 84 stores an operating system 94 for controlling the operation of the tracking server 40. It will be appreciated that this component may comprise a general-purpose server operating system as is known to those of ordinary skill in the art, such as UNIX, LINUX™, or Microsoft WINDOWS NT®.

The mass memory 84 also stores a redirect processing application 94 and the tracking application program 90. The tracking application 90 comprises computer executable instructions which, when executed by the consumer computer 28, causes the consumer computer 28 to stream data back to the tracking server 40 that describes the user's interactive session. The tracking application will be described in greater detail below with respect to FIG. 11.

Mass memory 84 also stores a script 92 which is sent along with the tracking application 90 via the Internet 20 to the consumer computer 28. The script 92 contains code that causes the consumer computer 28 to execute the tracking application 90. The tracking application 90 and script 92 are sent with a copy of the requested resource 58 retrieved from the Web server 32 by redirect processing application 94. As mentioned above and described in detail below, the tracking application 90 and script 92 operate to cause of stream of data describing the user's interactive session to be sent to the tracking server 40.

The mass memory 84 also stores a playback viewer application 96 and a playback request processing application 98 for allowing business 38 to replay the recorded session. The operation of the playback viewer application 96 and the playback request processing application 98 will be described in greater detail with respect to FIGS. 13 and 14. It will be appreciated that all of the above-described components may be stored on a computer-readable medium and loaded into the memory 84 of the tracking server 40 using a drive mechanism associated with the computer-readable medium, such as a floppy, CD-ROM or DVD-ROM drive.

The tracking server 40 is also operatively connected to a recording database 80 (FIG. 1) for storing data describing the interactive sessions between a user and a tracked resource. For instance, the tracking server 40 may store the following data in the recording database 80 for each interactive session: user location, basic information about the consumer computer, such as platform, resolution, color depth, browser version, and clipboard data, inputs such as keystrokes, mousemoves, mouseclicks, and scrolling that affects the browser window provided by the operator of the consumer computer using computer input devices such as a keyboard, mouse or light pen, and the state of various controls on the resource (Web page), e.g. the fact that a checkbox is selected or not.

Interactive sessions may be grouped by location, i.e. URL, and may be sorted by discrete data, such as clickstream (sort by session), visitor, date, or length of session. One skilled in the relevant art will appreciate that the sessions may be sorted by other data or criteria as well. The business 38 may also assign an additional classification (or "type") to the session (e.g. "new user") for future analysis. Those skilled in the art should appreciate that the recording database 80 may be stored locally on tracking server 40, or remotely at other computers in a networked computing environment like the Internet 20.

Figure 6:
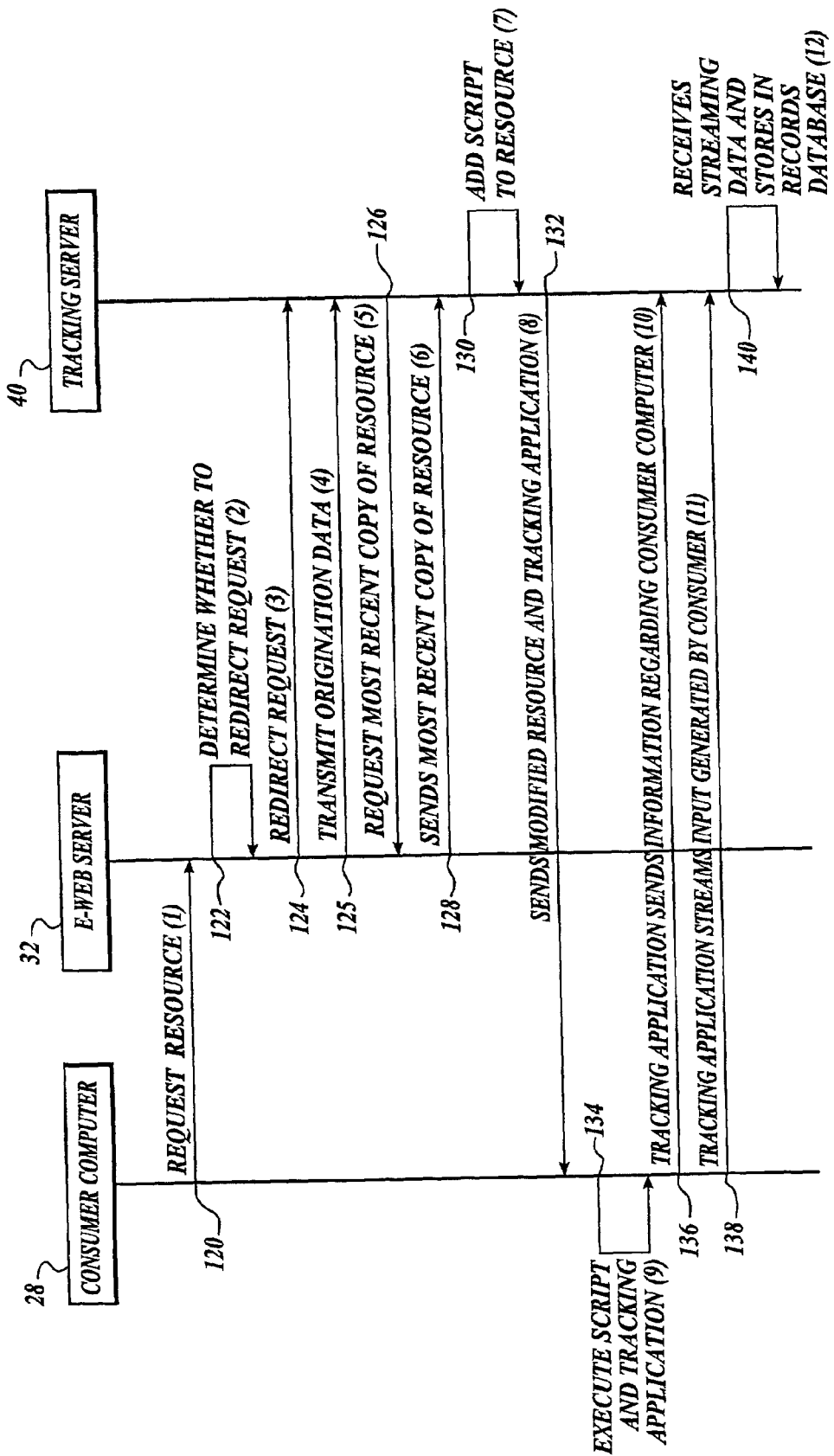
FIG. 6 is a parallel functionality diagram depicting the interaction between a consumer computer, a Web server, and a tracking server in accordance with an actual embodiment of the present invention.

The recording of interactive sessions between a user and the resource 58 from the Web server 32 will now be described in detail with respect to FIGS. 6 and 7. The following description describes the recording of interactive sessions with a signal resource for illustrative purposes only, and therefore should not be construed as limiting. One skilled in the art will appreciate that the interactive session with multiple resources may also be recorded. Referring to FIG. 6, a user requests a tracked resource 58 or Web page from the Web server 32 utilizing a Web browser at block 120. The business 38, prior to a user requesting the resource 58, determines the resources 58 or Web pages of the Web site that should be tracked. When a resource 58 to be tracked is requested at block 120, the Web server 32 determines whether or not to track the resource at block 122. If the requested resource is to be tracked, the Web server 32 redirects the request to the tracking server at block 124. Along with redirecting the request, the Web server 32 transmits origination data, such as a HTTP header, to the tracking server 40 at block 125. In an actual embodiment of the present invention, the Web server 32 may randomly redirect a percentage of the users requesting the resource to the tracking server 40. Additionally, once the user is being tracked, the user can be automatically tracked as they move from page to page throughout the web site.

The redirect processing application 94 running on the tracking server 40 receives the redirected user request and the origination data from the Web server 32. Next, at block 126, the processing application 94 requests a copy of the most recent version of the resource 58 requested by the user, from the Web server 32. The redirect processing application 94 utilizes the origination data so that the tracking server receives the exact resource which can accurately mimic the original request. After the Web server 32 sends the requested resource at block 128, the processing application 94, at block 130, merges the resource retrieved from the Web server 32 with the script 92 and changes the base tag and modifies any script and framesets contained within the resource to reference the Web server 32. At block 132, the processing application 94 sends the proxied resource, merged with the script 92, along with the tracking application 90 to the consumer computer 28. The tracking server permanently stores a copy of the requested resource.

When the tracked resource is loaded by the Web browser executing on the consumer computer 28, the script 92 and the tracking application 90 are executed at block 134. The script 92 retrieves information about the consumer computer 28 such as browser type, screen resolution, and the like, and sends this information to the tracking application 90. The tracking application 90 then opens a connection to the redirect processing application 94 on the tracking server 40 and sends the information about the consumer computer at block 136. The redirect processing application 94 formats this session information and inserts it into the recording database 80 via a Java Database Connectivity ("JDBC") application program interface (API). This database entry associates the business 38, the location of the resource, the session data, and the visitor with the data stream that is about to be sent by the tracking application 90.

At block 138, the tracking application 90 streams data describing the user's input with the resource, such as typing and scrolling, to the tracking application 90, so that it can be forwarded to and stored at the associated database 80 at block 140. At block 140, the tracking application 90 batches the events, compresses the data, and securely streams them back to the redirect processing application 94 on the tracking server 40 via the connection. The database 80 maintains a persistent storage of the sessions, their related events, and any relevant user information such as location.

Figure 7:
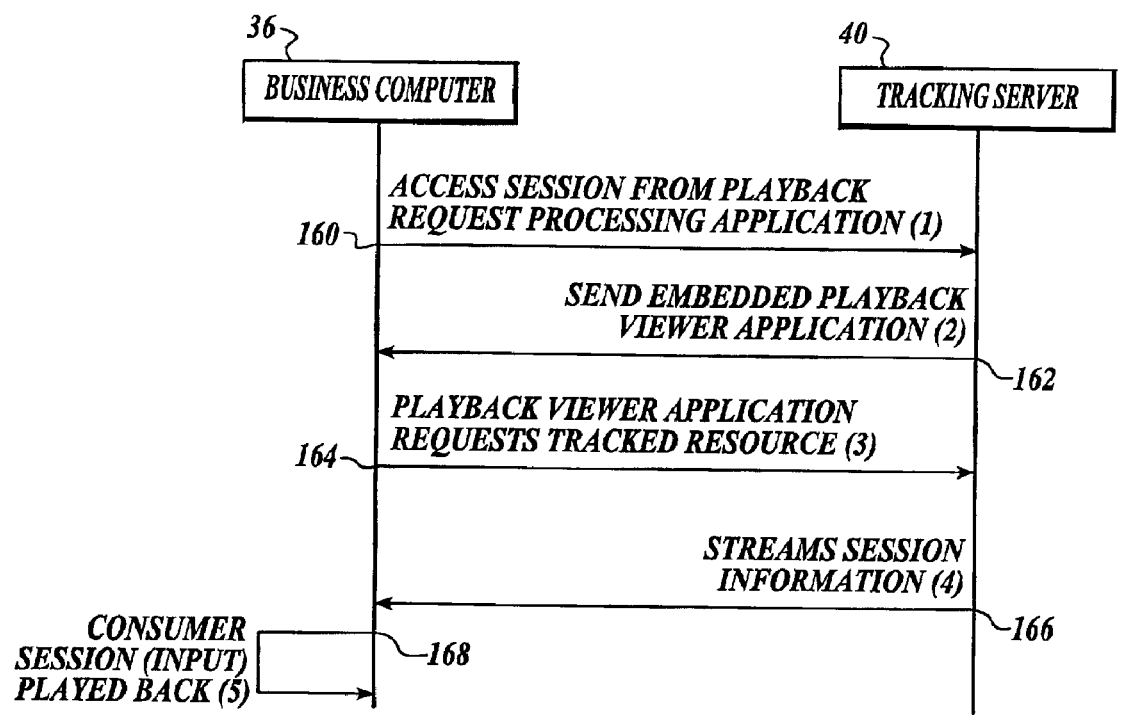
FIG. 7 is a parallel functionality diagram depicting the interaction between the business computer and the tracking server when replaying a recorded session in accordance with an actual embodiment of the present invention.

Referring now to FIG. 7, a functionality diagram will be described illustrating how a recorded session may be viewed by the business 38 operating Web server 32. When the business 38 decides to analyze a user's interaction with one of the tracked resources 58, a representative of the business 38 will access the recorded session from the playback request processing application 98 on tracking server 40 at block 160. At block 162, the tracking server 40 sends the playback viewer application 96 to the business computer 36 to be executed. Each of the sessions recorded by the tracking server 40 is available via the playback request processing application 98. Sessions are grouped by location and may be sorted by data such as visitor, date, length of session and the like. At this point the business 38 may assign an additional classification (or "type") to the session (e.g. "new user") for future analysis.

The playback of a session is controlled by the playback viewer application 96. At block 164, the playback viewer application 96 requests the tracked resource 58 from the tracking server. The playback viewer application 96 launches another browser window or re-uses a currently open browser window at the business computer 36 to display the tracked resource exactly as it was shown to the user, including browser size and screen placement. After the browser window is obtained, the playback viewer 96 application requests the session data from the playback request processing application 98 on tracking server 40. At block 166, the playback request processing application 98 sends the session data to the business computer 36 to be viewed by the business 38. The session is then replayed in real time at block 168. The playback viewer application 96 uses the application program interface (API), such as Windows API or the like, to recreate the events as accurately as possible so that the browser will be unable to differentiate between a replayed mouseclick and an actual user click.

Figure 8:
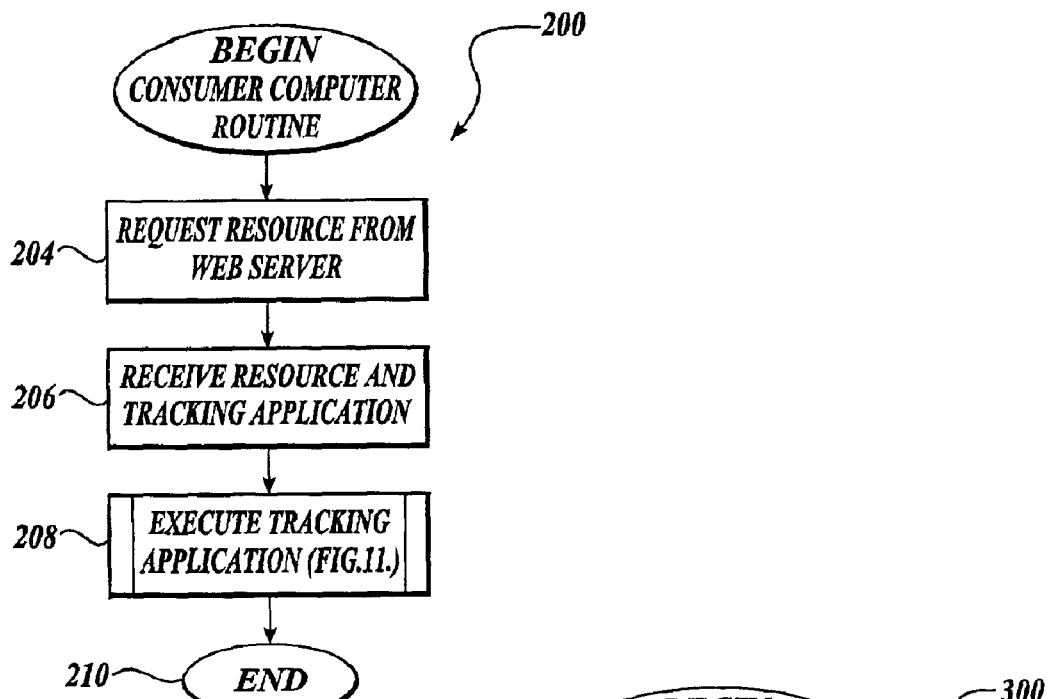
FIG. 8 is a flow diagram illustrating a routine implemented by the consumer computer for generating data describing an interactive session with a tracked resource in accordance with aspects of the present invention.

Referring now to FIG. 8, routine 200 will be described showing the operation of the consumer computer 28 when generating an interactive session. The routine 200 begins at block 204, where the user operating the consumer computer 28 requests the resource 58 from the Web server 32 using a Web browser. For example, the user may wish to receive flight information from a travel Web site operating on Web server 32. The user enters the specific URL for the Web site within the browser. This causes the browser to request the resource, i.e. Web page, associated with the identified URL.

After the user requests the resource from Web server 32 at block 204, the routine 200 proceeds to block 206, where the consumer computer 28 obtains or receives a copy or proxy of the requested resource 58 from the tracking server 40. Received along with the copy of the resource 58 is the tracking application 90 and script 92. As described above, the tracking application 90 can be an executable program or applet, as known in the art. It will be appreciated that the consumer computer may receive a message (visible or invisible) that indicates that the user request was redirected to the tracking server 40. In a preferred embodiment of the present invention, the user is not aware that her request has been redirected and has received an executable program that will record her interaction with the requested resource.

Next, at block 208, the tracking application 90 and script 92 are executed on the consumer computer 28. As will be discussed in more detail below with respect to FIG. 11, the tracking application 90 receives data representing the user's input from input devices such as the keyboard or mouse associated with the interactive session between the user and the copy of the resource received from tracking server 40, and streams the associated data back to the tracking server 40 for storage. If the user leaves the tracked resource, the routine ends at block 210.

Figure 9:
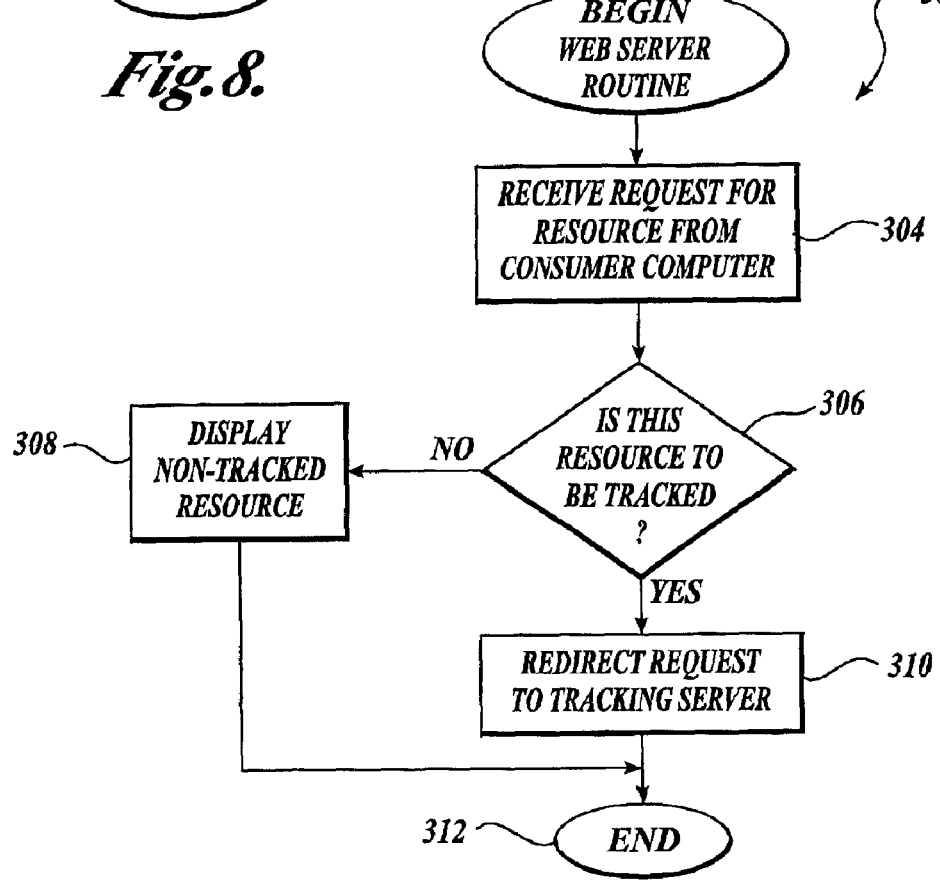
FIG. 9 is a flow diagram illustrating a routine implemented by a server computer for initiating the tracking of an interactive session in accordance with an actual embodiment of the present invention.

Referring now to FIG. 9, an illustrative routine 300 will be described that illustrates the operation of the Web server 32. The routine 300 begins at block 304, where the Web server 32 receives a request for a resource 58 from the consumer computer 28. For example, the travel Web site located on Web server 32 could receive a request from the consumer computer 28 for a resource containing flight information. After the request for the resource 58 is received, the logic proceeds to a decision block 306, where a determination is made as to whether the resource 58 is to be tracked.

In an actual embodiment of the present invention, the business 38 operating the Web server 32 decides which resource, i.e. Web page, is going to be tracked from the Web site. To this end, the business places an executable component, redirect program code 70, into the source code of every resource that is to be tracked. The playback request processing application 98, which will be described in more detail below, includes an "Add Tracker" feature that requires the business to input the URL, application server type, and specify the fraction of traffic that should be recorded. The tracking server 40 stores this information in an entry in a location table of the database 80. The redirect program code 70 is generated by a program module of the playback request processing application 98, such as an account manager program module, located on the tracking server 40 based on the business input of the "Add Tracker" feature. Those of ordinary skill in the art will appreciate that the playback request processing application 98 may include many more program modules that when executed, perform functions such as generating tracking statistics.

The small code block for each location, in this case, Web server 32 depends on the type of the server (e.g. Active Server Pages ("ASP"), Java Server Pages ("JSP"), standard HTML, etc.) and the fraction of traffic that is to be recorded. If, at block 306, it is determined that the requested resource is to be tracked, the routine 300 proceeds to block 310 where the Web server 32 redirects the request from the consumer computer 28, along with the transmission of origination data to the tracking server 40. In one embodiment, the origination data are HTTP headers that are stored in a hash map so that HTTP headers can be passed back to accurately mimic the original request. The routine then ends at block 312.

Returning to block 306, if the requested resource is not to be tracked, the routine proceeds to block 308, where the non-tracked resource is displayed. The routine ends at block 312.

Figure 10:
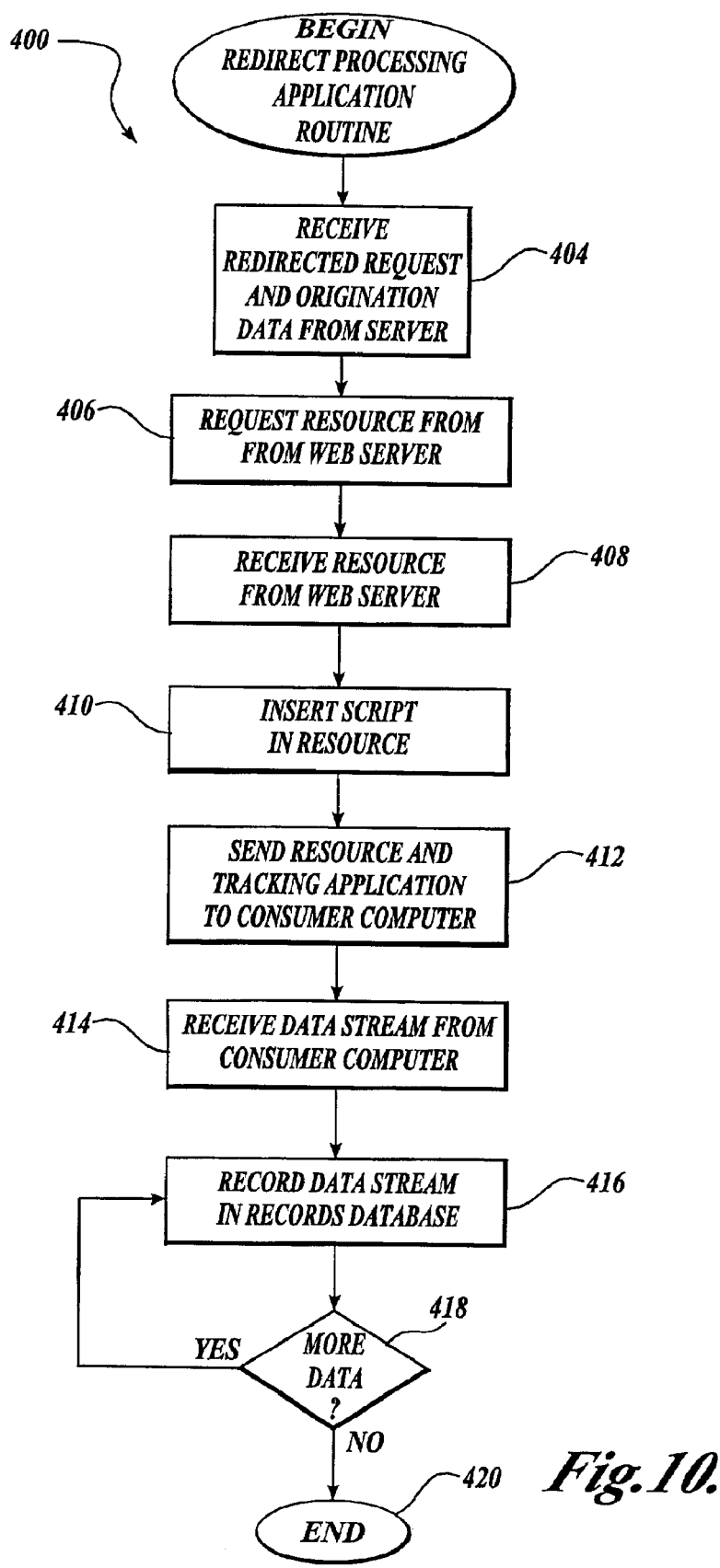
FIG. 10 is a flow diagram illustrating a routine implemented by a redirect processing application of a tracking server for processing the redirected consumer request in accordance with aspects of the present invention.

Referring now to FIG. 10, a routine 400 illustrating the operation of the redirect processing application 94 will be described. The routine 400 begins at block 404, where the tracking server 40 receives the redirected request for the resource 58 and the origination data from the Web server 32. In one embodiment, as described above, the origination data in the form of HTTP headers is store in the hash map of the tracker server 40. From block 404, the routine 400 continues to block 406, where the tracking server 40 transmits a request to the Web server 32 for a copy or proxy of the resource 58 to be tracked. In an actual embodiment, the redirect processing application 94 executing routine 400 opens an HTTP connection with the Web server 32 and utilizes the origination data to retrieve the most recent version of the resource, i.e. web page, requested by the user. For example, the redirect processing application 94 sends a request to retrieve the latest version of the travel web page that the user wishes to obtain flight information from.

From block 406, the routine 400 continues to block 408, where the redirect processing application 94 receives the resource, i.e. web page, from the Web server 32 and permanently stores it at the tracking server 40. The routine 400 then proceeds to block 410 where the redirect processing application 94 inserts the script 92 into the resource retrieved from the Web server 32 and changes the base tags and modifies any script and framesets to reference the Web server 32. After the script 92 has been inserted into the resource at block 410, the routine 400 continues to block 412, where the tracking server 40 sends the modified resource and the script 92 along with the tracking application 90 to the consumer computer 28.

From block 412, the routine 400 continues to block 414, where the redirect processing application 94 receives the data stream corresponding to the interactive session between the user and the resource. For example, as the user navigates (i.e. mouse movements and scrolling) through the travel Web page, each input event or interaction is streamed back to the tracking server 40 by the tracking application 90. The routine 400 proceeds to block 416 where the data stream is recorded and stored in the recording database 80. In an actual embodiment of the present invention, the redirect processing application 94 formats the interactive session information and inserts it into the records database 86 via JDBC. This insertion links the business 38, resource, and user with the transmitted stream of data. From this point on, every interactive input or event generated by the user, such as typing, mouse movements and scrolling, is sent to the tracking application 90 (as well as the browser) so that it can be forwarded to the database 90 at the tracking server 40. The tracking application 90 batches the events, compresses the data, and securely streams them back to the processing application 94 on the tracking server 40 via a HTTP connection.

After the redirect processing application 94 receives the data stream from the consumer computer 28, the logic proceeds to a decision block 418 and determines if more data is being received. As described above, if the user decides to leave the tracked page, the tracking application ceases to stream back data associated with the inputs of the user after the user has left the tracked resource. If so, the routine 400 returns to block 416 to continue to record the data stream in the records database 86. Otherwise, the Routine 400 ends at block 420.

Figure 11:
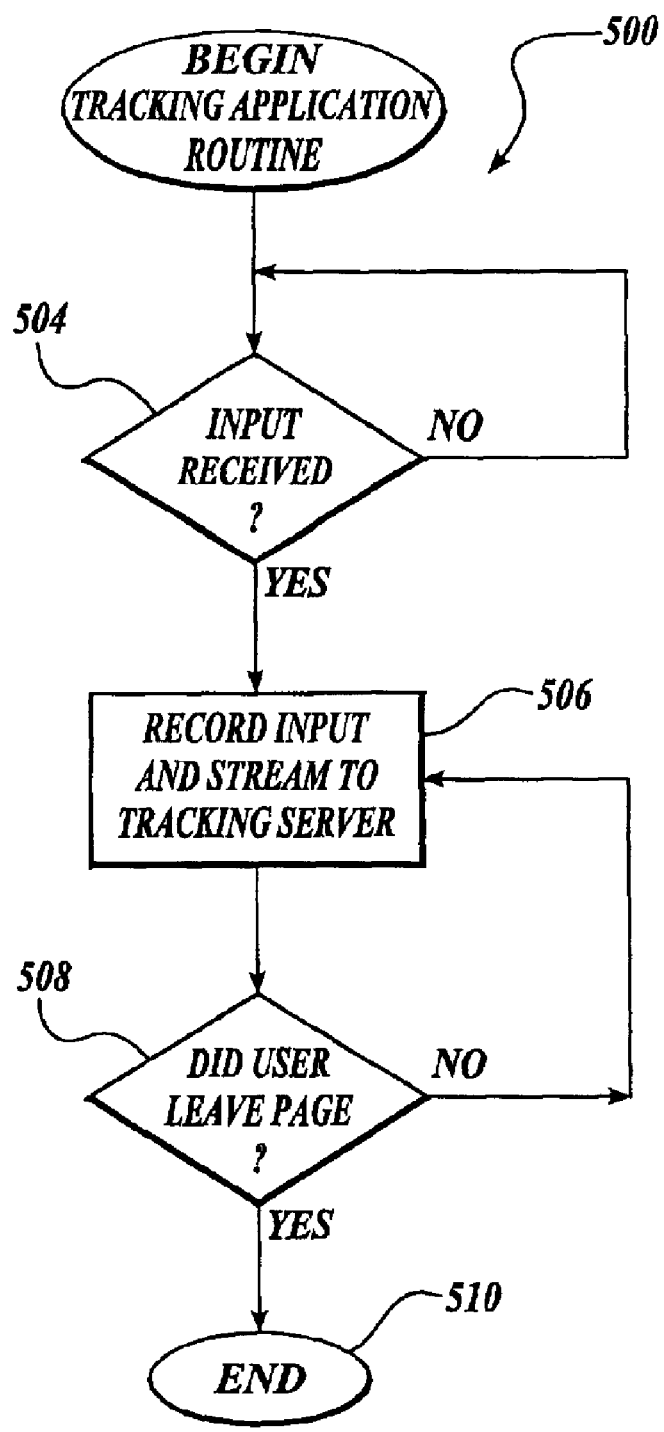
FIG. 11 depicts the execution of a tracking application routine performed by a consumer computer.

As described briefly above with respect to FIG. 8, FIG. 11 depicts the execution of the tracking application in greater detail. Turning now to FIG. 11, such a routine 500 will now be described. The routine 500 begins at block 504 where a determination is made as to whether an input signal (e.g. mouse movement, keyboard stroke) has been received. If so, the routine 500 proceeds to block 506 where the tracking application records the input and streams the input to the tracking server 40. If no input is detected at block 504, the routine 500 returns to block 504 to continue to wait for an input to be received.

At block 506, the tracking application 90 records the input generated by the user while interacting with the resource. The tracking application 90 opens a connection between the consumer computer 28 and the tracking server 40 and streams the input data back to the tracking server 40 to be stored. At decision block 508, a determination is made as to whether the user has left the tracked resource. For example, the user could have "clicked" on a hyperlinked document within the resource, or typed in a new URL in the browser window. In either case, the user would leave the tracked resource and receive the resource that corresponds with the specific URL that was enter from either typing or "clicking" the mouse. In one embodiment of the present invention as described above, the redirect program code is operable to remain tracking the user throughout the Web site, regardless of whether the next requested resource has the redirect program code. The redirect program code would terminate tracking a resource after the user had left the Web site.

It will be appreciated that the user could request another resource that is to be tracked, either by Web server 32 or another business on the Internet 20 wanting their resource to be tracked. If this is the case, a new session is to be recorded and the routine 500 returns to block 202 to begin a new tracked session. If the routine determines that the user has left the tracked resource, the tracking application 90 returns at block 510 to the routine 200 shown in FIG. 8. Otherwise, the routine returns to block 506 to continuously record and stream the input data from consumer computer 28 until the user leaves the resource in a way, for example, as described above. The tracking application 90 returns to block 510 if the user has left the tracked resource, where the logic of routine 200 proceeds to block 210 to end the routine.

Figure 12:
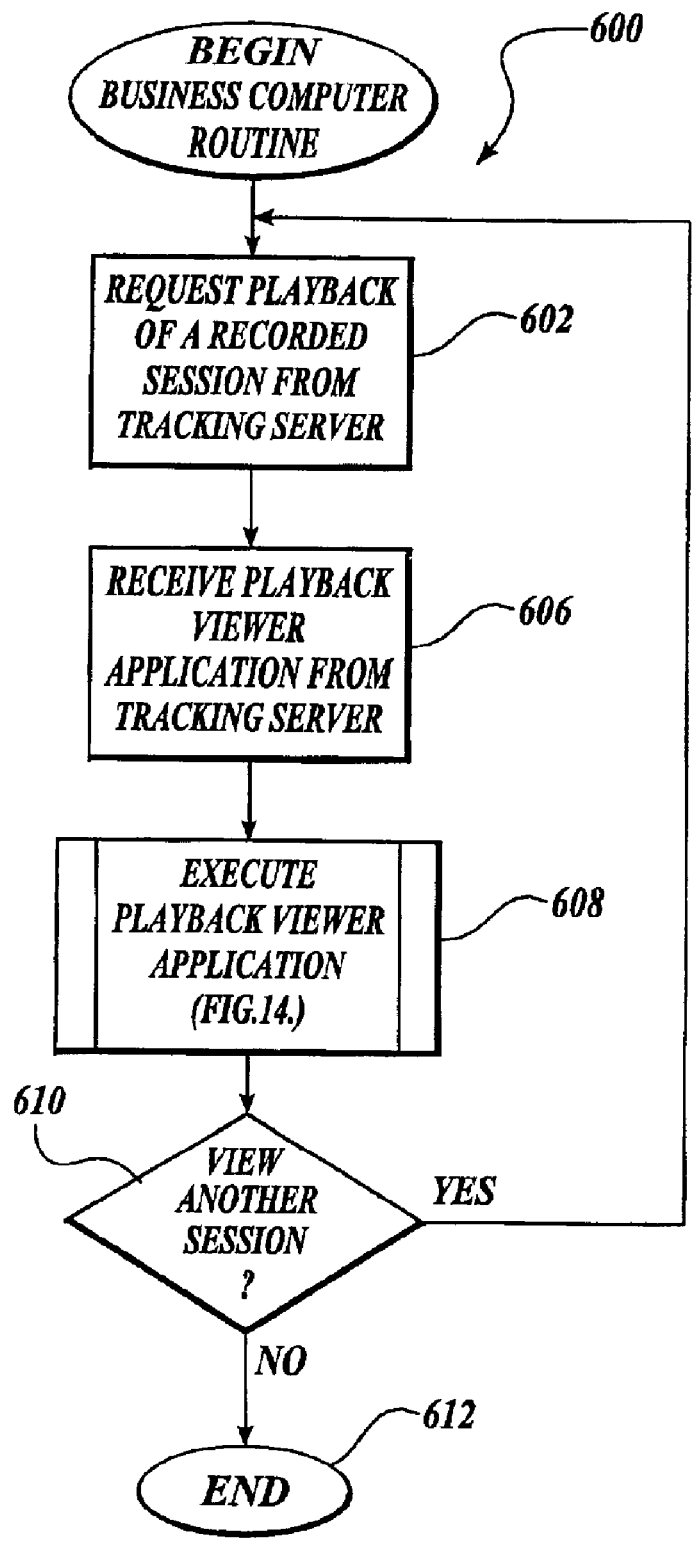
FIG. 12 is a flow diagram illustrating a routine implemented by a business computer for viewing a previously recorded interactive session generated by a tracking application in accordance with an actual embodiment of the present invention.

Referring now to FIG. 12, an illustrative routine 600 will be described for viewing a pre-recorded interactive session generated by the tracking application 90. The routine 600 begins at block 604, where the business 38 operating the business computer 36 requests playback of a recorded session from the tracking server 40. For example, the business may wish to view a session generated between a user and a Web page of the travel Web site, or between a user an a web site located on the Web server 32.

After the business 38 requests a session playback from the tracking server 40 at block 604, the routine 600 proceeds to block 606 where the business computer 36 obtains or receives the playback viewer application 96, such as an ActiveX control program, from the tracking server 40. The routine 600 then continues to block 608, where the playback viewer application 96 is executed on the business computer 36. As will be discussed in more detail below, the playback viewer application 96 receives the stream data from the tracking server 40 and recreates the interactive session for review. Operation of the playback viewer application 96 is described in greater detail below with respect of FIG. 14. The routine 600 proceeds from block 608 to decision block 610 where a determination is made as to whether the business 38 wants to view another session from a resource. If so, the routine returns to block 604. Otherwise, the routine ends at block 612.

Figure 14:
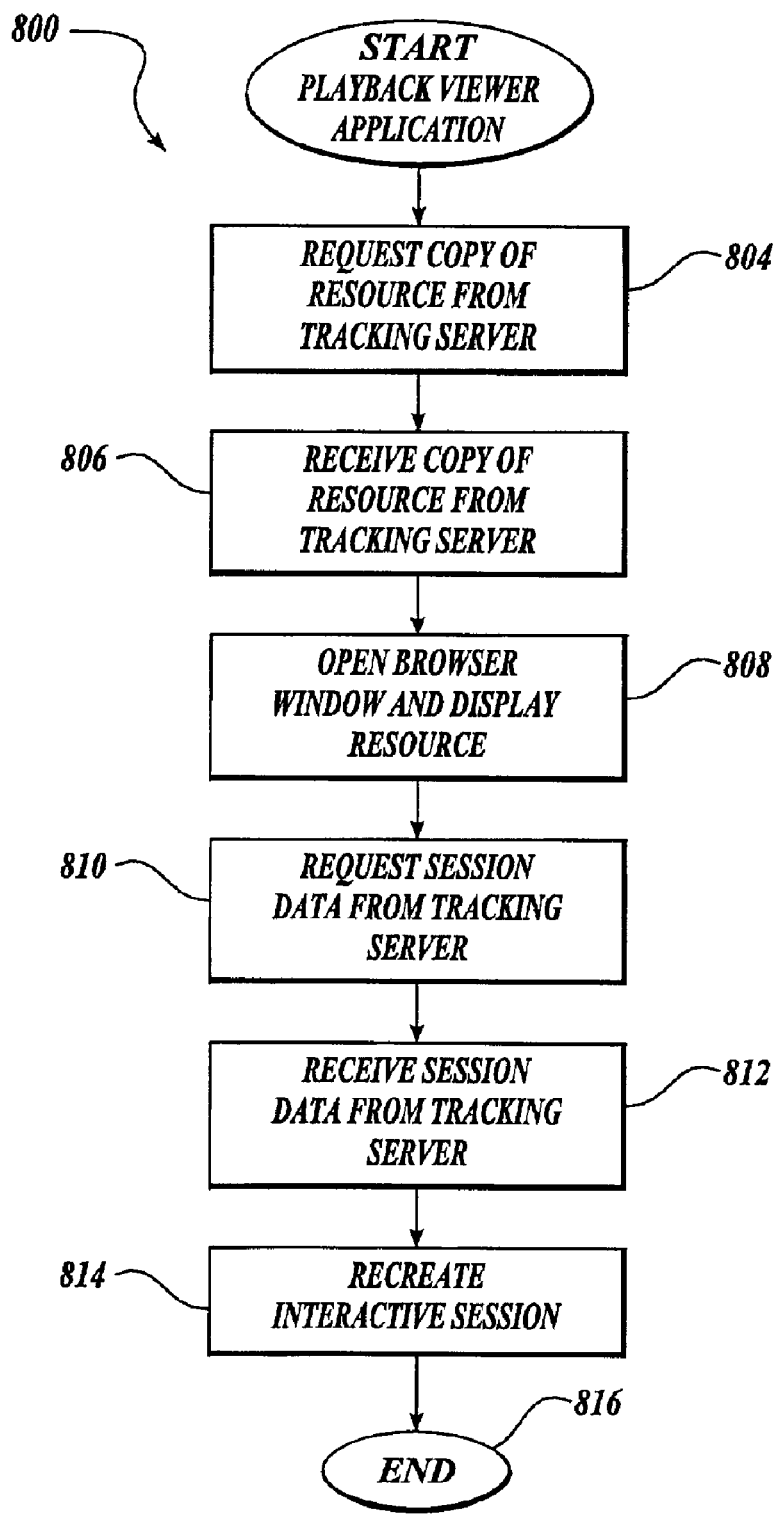
FIG. 14 depicts the execution of a playback viewer application routine performed by a business computer, according to an actual embodiment of the present invention.

Turning now FIG. 14, an illustrative routine 800 will be described showing the operation of the playback viewer application. The routine 800 begins at block 804, where the playback viewer application 96 requests a copy of the resource 58 from the tracking server 40. At block 806, the playback viewer application 94 receives a copy of the resource from the tracking server 40. At block 808, the playback viewer application 96 opens a browser window on the business computer 36. One skilled in the relevant art will appreciate that the browser window may be new, or may be a previously used browser window. The browser window has the same dimensions as the browser originally utilized by the user to display the resource. At block 810, the playback viewer application 96 requests the session data from the tracking server 40 corresponding to the specific session to be viewed. At block 812, the playback viewer application 96 receives the session data streamed from the tracking server 40. In an actual embodiment of the present invention, the tracking server 40 includes a playback request processing application 98 that receives the request for session data, retrieves the session data from the associated database, and sends the session data to the playback viewer application 96.

After receiving the session data at block 812, the playback viewer application 96 recreates the interactive session by displaying the resource in the browser window and displaying the session data so as to recreate the user's original interactive session with the resource. In an actual embodiment, the playback viewer application uses the application program interface (API) to recreate the session as accurately as possible so that the session substantially resembles the actual interactive session between the user and the tracked resource. For example, a copy of the travel Web page is opened into a browser window. The data representing the interactive session is played over the travel Web page to display the exact user interaction with the Web page. In this manner, the user's original mouse movements, mouse clicks, screen scrolls, etc. will be replayed on the business computer in exactly the same manner as they were originally made by the user on the consumer computer. After playback of the session, the routine 800 ends at block 816. It is to be understood that the playback viewer application 96 can have features such as pause, rewind, fast forward, so that the business 38 can properly analyze how the user interacted with the resource 58. This analysis may then be used by the business to improve the resource in ways such as better design layout.

Figure 13:
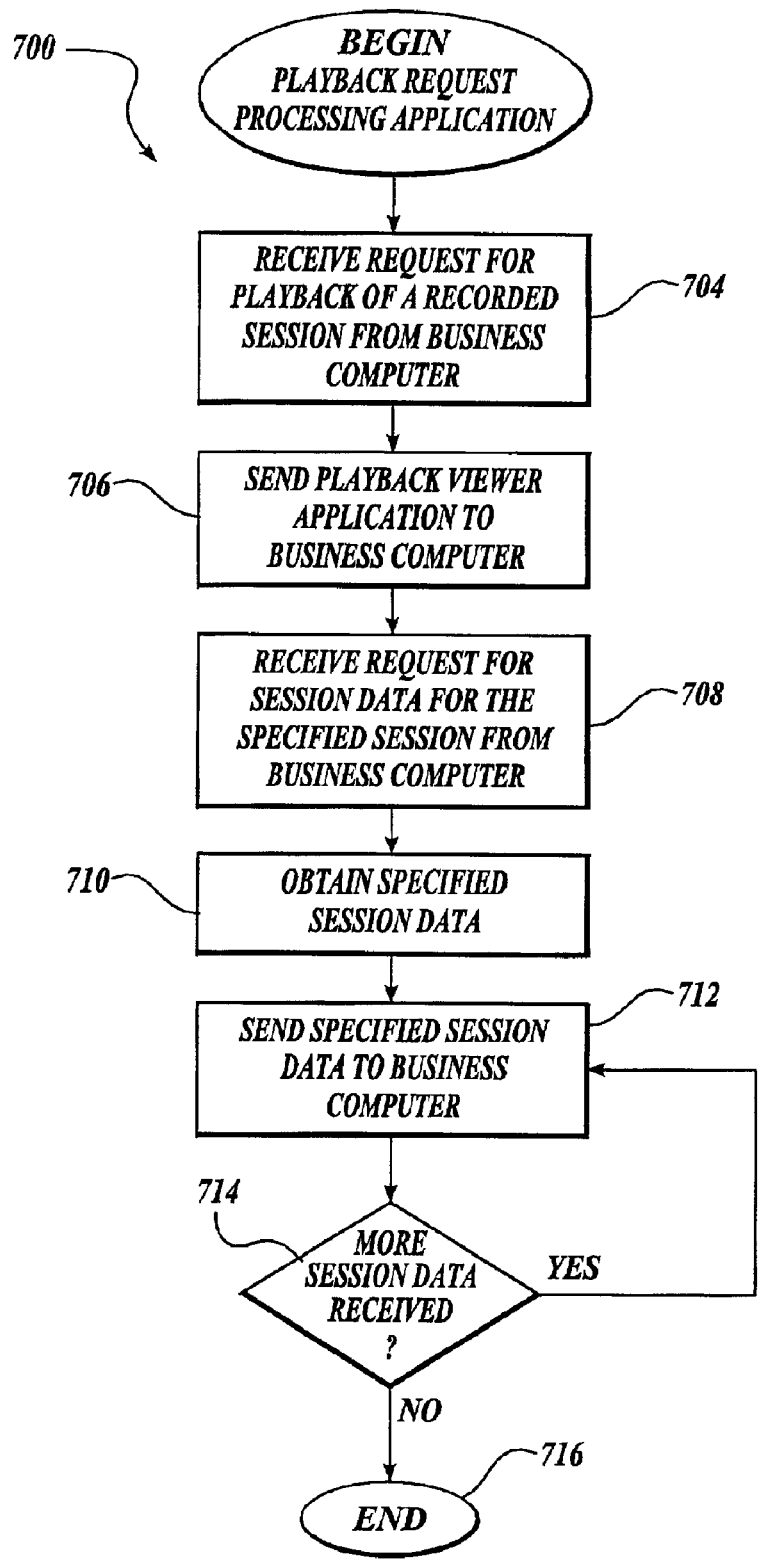
FIG. 13 is a flow diagram illustrating a routine implemented by a playback request processing application for processing a request to play back a previously recorded interactive session with respect to an actual embodiment of the present invention.

Referring now to FIG. 13, an illustrative routine 700 will be described showing the operation of the playback request processing application 98. The routine 700 begins at block 704, where the playback request processing application 98 receives a request for a playback of the recorded session. In an actual embodiment, the recorded sessions are identified by the processing application 98 using parameters such as user, date, and length of session. Each parameter corresponds to the session data stored in database 86. After the request for a playback of a session is received at block 704, the routine 700 proceeds to block 706 where the processing application 98 sends a playback viewer application 96 to the business computer 36. For example, a request can be made by "clicking" on the displayed parameter associated with the session the business wishes to review.

After the playback viewer application 96 is executed at the business computer 36 as described above with reference to FIG. 14, the playback request processing application 98 receives, at block 708, a request for session data associated with the session specified by the business computer at block 704. Next, at block 710, the playback request processing application 98 obtains the specified session data and sends the specified session data to business computer 36 at block 712. It will be appreciated that the playback request processing application 98 can obtain the session data from the records database 80 or may obtain the data from the tracking server memory. The routine 700 then proceeds to the decision block 714 where a determination is made as to whether more session data is being obtained from, in this case, the records database. If so, the routine 700 returns to block 712 to continue sending the data to the business computer 36. Otherwise, the routine 700 ends at block 716.

The previously described implementation of the present invention provides advantages over software currently available in the art. The present invention provides a Web-based tool that allows every aspect of a user's interaction with a targeted Web site to be transparently recorded. By transparently recording the interaction, any analogues of the "Hawthorne Effect" that may be introduced during artificial usability studies overseen by humans are removed. By utilizing a tool that can record a user's interaction with a specific Web page or Web pages, a business or resource designer of the Web pages can view and analyze the user's input for ways to improve the Web pages, such as making it more user friendly or more easily navigable.

While the illustrative embodiment described above described a system and method for recording the interactive session between a user and a resource, such as a Web page, it will be readily evident to one skilled in the art that the system and method may record the interactive session between a user and multiple resources, such as a Web site. For example, in one embodiment, the redirect program code is operable to remain tracking the user throughout the Web site, regardless of whether the next requested resource has the redirect program code. In this instance, the session data recorded will represent one constant stream of data corresponding to the users interaction with the Web site (multiple resources).

While an illustrative embodiment of the invention has been illustrated and described, it will be appreciated that various changes can be made therein without departing from the spirit and scope of the invention.

What is claimed is:

1. A method for replaying a user's interactive session with a tracked resource, comprising:

requesting data describing said interactive session;

receiving said data and a copy of said tracked resource;

displaying said tracked resource; and displaying said data describing said interactive session in a manner so as to recreate exactly said user's interactive session.

2. The method of claim 1, further comprising:

receiving a program module for requesting said data representative of said interactive session and said copy of said tracked resource.

3. The method of claim 2, wherein said program displays said tracked resource and said data describing said interactive session.

4. A computer controlled apparatus capable of performing the method of any one of claims 1–3.

5. A computer readable medium comprising computer readable instructions which, when executed by a computer, cause the computer to perform the method of any one of claims 1–3.

* * * * *

UNITED STATES PATENT AND TRADEMARK OFFICE
CERTIFICATE OF CORRECTION

PATENT NO. : 6,877,007 B1
DATED : April 5, 2005
INVENTOR(S) : A.M. Hentzel et al.

It is certified that error appears in the above-identified patent and that said Letters Patent is hereby corrected as shown below:

Title page,
Item [56], References Cited, OTHER PUBLICATIONS, "IBM TDB," reference, "Non-Dis-
tplay" should read -- Non-Dis-
play --.

Signed and Sealed this

Twenty-second Day of November, 2005

JON W. DUDAS
*Director of the United States Patent and Trademark Office*